ABSTRACT

United States Patent [19]

Simonsen et al.

[11] 4,005,610
[45] Feb. 1, 1977

[54] CONVEYOR BELT

[75] Inventors: Harald Simonsen, Ludersen; Hans Specht; Klaus Baumgärtel, both of Berenbostel; Hans Meumann, Hannover, all of Germany

[73] Assignee: Continental Gummi-Werke Aktiengesellschaft, Hannover, Germany

[22] Filed: Mar. 27, 1975

[21] Appl. No.: 562,543

Related U.S. Application Data

[63] Continuation-in-part of Ser. No. 337,129, March 1, 1973, abandoned.

[30] Foreign Application Priority Data

Mar. 1, 1972   Germany ........................ 2209752

[52] U.S. Cl. ................................................ 74/237
[51] Int. Cl.² ........................................... F16G 1/22
[58] Field of Search ............. 74/231 M, 231 R, 237

[56] References Cited

UNITED STATES PATENTS

| | | | |
|---|---|---|---|
| 2,593,284 | 4/1952 | Ewell | 198/191 |
| 3,221,869 | 12/1965 | Paasche | 74/237 X |
| 3,498,684 | 3/1970 | Hallaman | 74/237 X |
| 3,736,805 | 6/1973 | Dent | 74/237 |
| 3,929,026 | 12/1975 | Hofmann | 74/237 |

FOREIGN PATENTS OR APPLICATIONS 468,332   9/1950   Canada ............................ 74/237

Primary Examiner—Leonard H. Gerin
Attorney, Agent, or Firm—Walter Becker

[57]   ABSTRACT

A conveyor belt of elastomeric material, especially natural and synthetic rubber material, with thread-shaped strength members extending in the longitudinal direction of the belt and being located in parallel spaced relationship to each other while being embedded in the elastomeric material of the belt, the strength members being in the form of wires united to each other by a single twist.

8 Claims, 4 Drawing Figures

U.S. Patent        Feb. 1, 1977        4,005,610
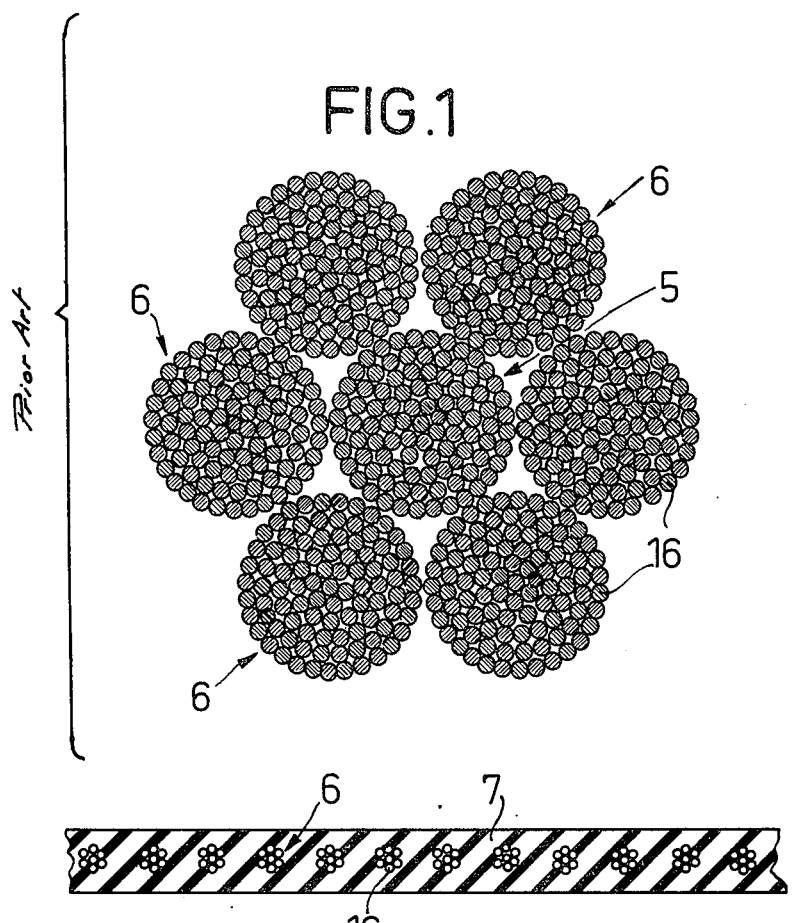
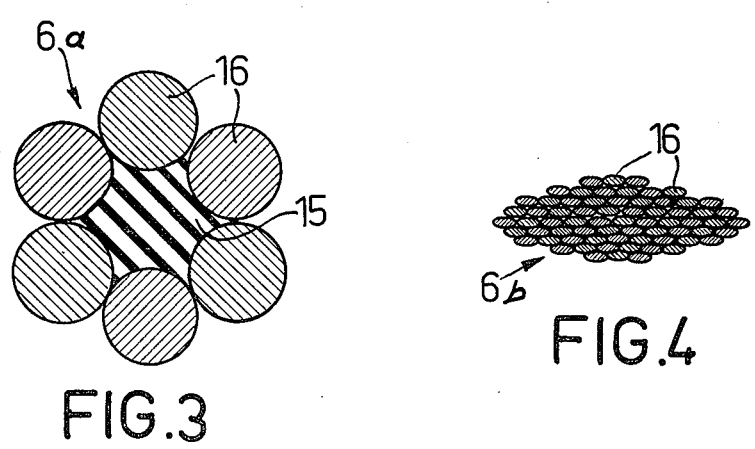

CONVEYOR BELT

This is a continuation-in-part of co-pending application Ser. No. 337,129-Simonsen et al. filed Mar. 1, 1973, now abandoned.

The present invention relates to conveyor belts of rubber or rubber-like synthetic materials with thread-shaped strength members embedded in said belt and arranged in mutually spaced relationship while extending parallel to each other in the longitudinal direction of the belts.

For belt conveyors with larger distances between the drums, with higher output and with correspondingly increased requirements concerning the pull resistance of the conveyor belts, belts with non-interwoven steel cables as strength carriers embedded in the belts so as not to touch each other have generally been preferred over belts with fabric reinforcing inserts. In view of the fact that the plurality of superimposed fabric inserts to be embedded in the belts have been completely eliminated, and in view of the simple buildup of a homogeneous elastomer with strength members distributed in one plane only, the conveyor belts with steel cable inserts have in addition to their higher pull resistance also a considerably improved troughability and a longer life even under continuous heavy duty. With reference to their reinforcing inserts which are characteristic for their behavior in operation, these fabric-free conveyor belts are generally designated as steel cable belts. In all known instances, the strength members consist of wire cables which are made by twisting steel wires of usually round profile first into strands and by combining a plurality of strands in a further twisting operation to a cable. Instead of a frequently customary hemp core, the strands may be wound about a similarly built-up core strand so that the cross sectional picture of the finished wire cables shows an uneven number of strands arranged symmetrically with regard to each other, for instance six outer strands in closed mutual contact distributed over the circumference of an inner core stand. Depending on the diameter and the pull resistance of the wire cables and their pitch, i.e. their mutual distances within the belt cross section, conveyor belts can be made for various loads. Taking into consideration these characteristic dimensions in cooperation with the strength of the cover plates and their extension as to width, the commercial belt designs for various applications are classified into rows of types and are in conformity with the German standards DIN classified relative to each other from St 1000 to St 4000. While these DIN-types offer a good selection for various types of application and in addition thereto there are also provided further supplementary types, the ratio of the belt strength to the diameter of the steel cables is not always an optimum as far as economy is concerned. This lack becomes manifest above all within the lower region of the standardized sizes because below a pull resistance limit of approximately 1000 kilograms per centimeter, steel cable belts are considerably more expensive than fabric reinforced belts and then justify the higher costs only in view of their superior life span. Therefore, industry has for a long time desired to widen the field of application of the steel cable belts without doing so at the expense of economy and has in particular desired to widen the field of the steel cable belts in the direction toward those fields where heretofore the fabric reinforced belts were preferred. It is an object of this invention to meet these requirements of industry.

This object and other objects and advantages of the present invention will appear more clearly from the following specification in connection with the accompanying drawing, in which:

FIG. 1 illustrates a cross section through an ordinary wire cable representing prior art.

DFIG. 2 is a cross section through a portion of a conveyor belt according to the invention.

FIGS. 3 and 4 respectively illustrate cross sections of wire strands used in connection with the present invention, FIGS. 3 and 4 being shown on a larger scale than FIG. 2.

A conveyor belt according to the present invention is characterized primarily in that the strength members form strands of wires united in a single twisting operation. Preferably, the wires are monofile round steel wires, and the strands made up of said wires are selectively composed of wires of uniform cross sectional surfaces or the strands are made of cross sectionally uniform wires which are wound around a core wire which has a greater cross sectional surface than the individual wires wound around said core wire.

Referring now to the drawing in detail, the wire cable illustrated in FIG. 1 and representing the prior art, is built up of six strands 6 which are wound around a core strand 5 while each of the strands 5, 6 which are of the same cross section and structure consist of a greater number of small drawn steel and tin-coated round wires 16. The structure and manufacture of such wire cables is known and may be varied at will in conformity with the respective requirements. It is merely important that each individual wire 16 will within the finished cable have at least a twofold twist. Wire cables of the illustrated type are employed as strength member inserts in conveyor belts.

When making a conveyor belt according to the invention as illustrated in FIG. 2, the manufacture starts with strands 6 according to FIG. 1. Inasmuch as the strands are made in a single twisting operation, each individual wire 16 will within the insert in the finished belt have only a single wound helical line. The finished twisted strands 6 are in a manner known per se embedded in the elastomeric material 7 of the belt body and adhere to the latter so that with regard to the manufacturing process no fundamental differences exist with regard to heretofore known wire cable belts. The cross sectional picture according to FIG. 3 illustrates the buildup of a strand 6a while employing less wires 16 of relatively large diameter over an elastomeric core 15. As a further modification, FIG. 4 shows a flat strand 6b of approximately elliptical cross section.

As will be evident from the above, the present invention realizes the object set forth above with surprisingly simple means by introducing a novel structural element for the strength members, so to speak, as a compromise between textile and steel cable inserts. The strands, which represent a prefabricated condition of the wires cables and according to their proper intention from only a component of said strands, are considerably more favorable as to costs than even a comparable complete cable made by a plurality of twisting operations. On the other hand, the strands employed as belt inserts have over purely fabric belts, even when employing high strength synthetic fibers, all advantages of the heretofore known steel cable conveyor belts. Thus, in particular for smaller conveyor installations with relatively low pulling forces and secondary impact stresses, the invention makes possible the employment of steel wire armed belts while avoiding uneconomical over-dimensions. The movable tensioning stations necessary for fabric reinforced conveyor belts therefore will be superfluous, and in addition to an increased safety of operation, also the servicing is reduced. Inasmuch as the relatively thin strands can be inserted in a greater number of cables, the invention in the end results in a greater total surface of the metallic strength members and in this way in a more favorable surface load. Simultaneously, also the safety reserve of belts according to the invention is greatly increased inasmuch as damage to and breaks in individual strands will have a correspondingly reduced effect.

The structure and quality of the strands may be varied in any desired manner, thus, the strands may be made in one step from monofile wires in a simple twisting operation or may also be made in a plurality of steps from wires subjected to a plurality of twisting operations. In the last mentioned instance, variations are possible by the selection of parallel twist or twist in opposite direction. The strands may be wound around a thicker core wire or around a core made of other substances, or may also be made in the manner of so-called spiral cables from any desired number of wires of the same size. The coordination of the wire diameter with the number of wires permits further possibilities of varying the cable in order to adapt the same to the particularities of the respective circumstances. It is also possible instead of round strands with a circular cross section to employ flat strands or strands with a cross section different from the customary circular cross section.

Prior art represented by Canadian Pat. No. 468,332-Freedlander pertains exclusively to V-belts and other force or power transmission belts in contrast to conveyor belts serving for transport purposes. Since the main problem concerns a bonding connection of the elastomeric work material with the metalic inserts, the constructive arrangement thereof would only remain in the background. Important in the present connection moreover is the multiple use of the expression "cables". Doubtless this can only be so understood that the concern in every viewpoint pertains to "finished" wire cables that do not require any further working and which also do not bring about the preliminary step to a more complex end product.

A consideration of U.S. Pat. No. 2,593,284-Ewell reveals that the same concerns production of steel cable conveyor belts as involving a special or separate area of conveyor technique. However, the essence of the present invention does not seem to be involved when considering the December 1945 filing date as to the state of the art. However, this Ewell disclosure involves complex construction using several strands over an elastomeric core. The wire cables thereof are supplied as finished elements for the utilization with conveyor belts by wire-working plants; the generally conventional designation "steel cable conveyor belts" for these especially developed belt constructions would set forth the predominant concepts of the most important construction components thereof. The present invention, however, proceeds over and beyond the disclosure of the reference; this is the main content of the present invention to be evaluated by diverging from the references in that the present invention precludes absolutely use of several strands for cable means and in place thereof utilizes individual strands; this means accordingly a preliminary product is introduced from cable production for installation as a full-value tensile stress support or carrier. For proper evaluation of the inventive concept, there appears to be necessary a more detailed statement as to the background as set forth in the following paragraphs.

Steel cable conveyor belts are a relatively recent type of development production and represent accordingly a special article which cannot be readily compared with belts of different construction or with still more remote power or force transfer belts, V-belts and the like. While in the beginning the known textile reinforced conveyor belts were equipped only additionally with wire cables extending therethrough as represented for example by the U.S. Pat. No. 2,593,284-Ewell, there was found after long hesitation and contrary to the concern of many affected circles that textile inserts could be eliminated or left out entirely, and the belts could be embodied only as steel wire reinforced belts, whereby naturally a greater number of steel cables had to be installed in the belt core in narrow separation which means with nominal spacing relative to each other. This novel type of conveyor belt proved so successful in practice that the same replaced previously conventional textile belts for heavy and most difficult installations, including long conveyor paths among others in spite of the generally higher production costs. The requirements primarily for mining in Germany led to fixing of norms and setting of characteristic measurements and characteristic sizes of these belts in graduations based upon practice.

Features can be briefly summarized to the effect that the novel conveyor belts do not include tensile strength members or carriers in the core as do otherwise conventional wire cables and ropes when considered to the letter, but rather in place thereof there is provided a preliminary product serving the cable production. Since this preliminary product (the so-called "strand") becomes formed by rotating together several individual elements, there is noted that the recitation of such a "rotation" also included in the characterizing part of the main claim to provide differentiation over the other tensile strength members or carriers. Two possible alternatives include that the strands are formed of massive wires (in other words, monofiles), and on the other hand, the wires themselves can be turned or rotated together using fine wires.

The general scheme of construction of wire cables and stranded wire is known in itself and belongs in multiple branches of technique as to the basic knowledge of experts so that the picture illustration of such usable machine elements more than likely would be superfluous. FIG. 3 is directed to a wire strand with an elastomeric core; the conventional arrangement of the wires, however, has been kept unchanged herefore, and the only divergence exists in the introduction of a rubber or synthetic material cable in place of the otherwise obligatory wire core. Recognition of the stranded wire construction is described in the special variation according to FIG. 3, so for support of the position there can be reliance upon the collective cross sectional illustration in FIG. 2. The wire strands embedded in the belt work material are clearly recognizable in this illustration of FIG. 2 as being provided with an outer wire corresponding to the core wire.

The basic concept of the present invention consists therein to replace the expensive and heavy wire cables in conveyor belts for predetermined insertion purposes as strength carriers replaced by way of less expensive and lighter elements without thereby on the other hand, reducing the strength of the particular belt in an impermissible or unacceptable measure. In other words, there is sought to widen the possibilities of application and use or installation of the steel cable reinforced belts and to push the same forward into previously precluded boundary areas with belts equipped with only textile inserts. The wire ropes or cables used conventionally for cable belts and other technical purposes are turned together out of wire strands. Proceeding from the wire as the smallest construction unit, there is noted that the production of the wire cables proceeds in three steps as follows: wire-strands-cable, whereby between the same and different inclined directions there can be selected on the one hand the strands for the build-up and on the other hand the cables having such characteristics. At all times since the first introduction of wire ropes or cables in the technique (in German mining in the year 1827) there was, however, clearly and alone prevalent the conception of such a multiple strand construction. This is apparent for example also in the terminology of the international patent classification.

Under such aspects, there can be an evaluation made as to the patent of Freedlander. The reinforcements or strength carriers described in this Canadian patent are designated especially for V-belts and are designated as "cables" and these in all cases are built-up out of "strands" whereby the individual strands on the other hand at a time consist of a multiplicity of fine wires. There is accordingly also heretofore nothing as to the conventional build-up scheme: wire-strands-cable being considered without any diversion therefrom and consequently, this patent disclosure does not go beyond the preconditions of the state of the art recognized in the present disclosure. There is stressed that according to the description of the Canadian patent disclosure these are woven out of many wires producing strands 10 first and then are turned together leading to the cables 16 ready for use (FIG. 1) or being interwoven with each other (FIG. 2).

Even if Freedlander not once could diverge from the conventional build-up scheme of reinforcements or strength carriers for V-belts so quite apparently there was not obvious therefrom to reinforce or strengthen in comparison thereto multiplely more heavy conveyor belts with bare strands as preliminary steps of ropes or cables.

Small strands are used with the present invention as shown in FIGS. 2 or 6, which have only single wires twisted around a solid core. This core may be a single wire as in FIG. 2, or a synthetic material, as in FIG. 3. With these solid wires, the strand is formed by a single twist, instead of twisting the strands together to form a cable, as in FIG. 1.

By utilizing small strands spaced transversely of the belt, as shown in FIG. 2, these wire strands are used in place of synthetic fibers. These have advantages for conveyor belts, as fully described in the foregoing specification. The belt of the Canadian Pat. No. 468,332 is a V-shape driving belt with wire strands closely packed in the neutral zone of the belt. This arrangement is not suitable for a conveyor belt wherein the strands are spaced transversely across the belt. The U.S. Pat. No. 2,593,284-Ewell shows a conveyor belt, but with cables such as illustrated in FIG. 1. Neither of these patents suggests a conveyor belt which may be made of small size with the advantages of the belt of the present invention.

There can be ascertained that in accordance with the present invention the conventional steel wire cables are replaced by way of strands as a preliminary step with respect to the cables and as an intermediate product of the ropemaking to attain an end effect making conveyor belts less expensive and matching tensile strength thereof to meet load requirements by way of filling out the gaps between the normalized belt types. Such has been indicated in the foregoing description.

The U.S. Pat. No. 3,681,911-Humphries confirms exactly that which is recognized to be known in the state of the art, particularly in the statements in lines 31/32 of column 4 thereof:

"The strands 75 are then stranded into the main rope 71 as is well known in the art".

This statement confirms what is set forth in the present case to be the status of the sequence of advance in production technique in a construction scheme including first cords, then strands and finally ropes.

It is, of course, to be understood that the present invention is, by no means, limited to the showing in the drawing but also comprises any modifications within the scope of the appended claims.

What we claim is:

1. A conveyor belt of elastomeric material for transport purposes, especially rubber material, which includes in combination strength members arranged substantially parallel and in transversely spaced relationship to each other and extending in the longitudinal direction of said belt while being embedded directly in bonding connection with the elastomeric material of the belt to lessen weight, said strength members consisting only of individual bare strands as conveyor belt inserts each composed of a plurality of finished wires united to each other about a solid core support member by a single twist in a preliminary product formed by rotating together several individual solid elements thereof.

2. A conveyor belt in combination to claim 1, in which said individual strands are composed of massive monofile wires.

3. A conveyor belt in combination according to claim 1, in which said individual strands are composed of fine wires twisted together in a plurality of stages.

4. A conveyor belt in combination according to claim 3, in which said strands are composed of round steel wires.

5. A conveyor belt in combination according to claim 4, in which said strands are composed of wires having at least approximately the same cross section.

6. A conveyor belt in combination according to claim 5, in which said strands are composed of wires of at least approximately uniform cross section, said wires being wound around an elastomeric core having a cross section greater than that of the individual wires of the respective strand.

7. A conveyor belt in combination according to claim 3, in which said strands are round strands having an at least approximately circular cross section.

8. A conveyor belt in combination according to claim 2, in which said strands are flat strands with a non-circular flat cross section.

* * * * *